(12) United States Patent
Counterman (10) Patent No.: US 9,883,401 B2
(45) Date of Patent: Jan. 30, 2018

(54) DIFFERENTIATING AUTHORIZATION REQUESTS FOR SECURITY REQUIREMENTS

(71) Applicant: Verizon Patent and Licensing Inc., Arlington, VA (US)

(72) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/093,054

(22) Filed: Apr. 7, 2016

(65) Prior Publication Data

US 2017/0295494 A1    Oct. 12, 2017

(51) Int. Cl.
*H04W 12/08* (2009.01)
*H04L 29/08* (2006.01)
*H04L 29/06* (2006.01)

(52) U.S. Cl.
CPC ............ *H04W 12/08* (2013.01); *H04L 63/10* (2013.01); *H04L 63/18* (2013.01); *H04L 67/02* (2013.01)

(58) Field of Classification Search
CPC .... H04L 29/06–29/06986; H04L 63/08; H04L 63/0876–63/0892; H04L 63/10–63/108; H04L 63/18–63/205; H04L 67/02–67/025; H04L 67/14; H04L 67/141; H04L 67/146; H04L 67/28–67/2895; H04L 69/22; H04L 69/322; H04L 69/325–69/329; H04W 12/06; H04W 12/08; H04W 88/182
See application file for complete search history.

(56) References Cited

U.S. PATENT DOCUMENTS

| | | | | |
|---|---|---|---|---|
| 2011/0252147 | A1* | 10/2011 | Ewe | G06F 17/30893 709/227 |
| 2015/0334593 | A1* | 11/2015 | Chen | H04W 28/0236 370/235 |
| 2016/0094467 | A1* | 3/2016 | Hong | H04L 45/24 370/235 |

* cited by examiner

*Primary Examiner* — Kevin Bechtel (57) ABSTRACT

A device may receive a request from a mobile device. The device may determine a port identifier for a port of the device. The port may correspond to whether the mobile device used a secure communication path to send the request. The device may determine a mobile device identifier for the mobile device. The device may add the mobile device identifier and the port identifier to the request. The device may send the request to an application device after adding the mobile device identifier and the port identifier to the request. The port identifier may be added to the request to enable the application device to determine whether the request was sent, by the mobile device, over the secure communication path.

20 Claims, 5 Drawing Sheets

DIFFERENTIATING AUTHORIZATION REQUESTS FOR SECURITY REQUIREMENTS

BACKGROUND

Intermediate devices may identify mobile devices that send requests (e.g., for content and/or services), via the intermediate devices, to application devices (e.g., devices that provide the content and/or the services). The application devices may authenticate the mobile devices based on the identification provided by the intermediate devices.

DETAILED DESCRIPTION OF PREFERRED EMBODIMENTS

The following detailed description of example implementations refers to the accompanying drawings. The same reference numbers in different drawings may identify the same or similar elements.

When an intermediate device receives a request (e.g., an authorization request and/or a request for content and/or services) from a mobile device, the intermediate device may forward the request to an application device (e.g., over an internal network, which may be unsecured). Because the application device is not directly receiving the request from the mobile device, the application device may not be able to determine whether the request was sent securely (e.g., using a secure session and/or with encryption), by the mobile device, to the intermediate device. Because the application device may not be able to determine whether the mobile device sent the request securely, the application device may not be able to determine how to handle the request (e.g., whether to process the request or to reject the request for failing to satisfy security requirements). Implementations described herein may enable a device receiving an authorization request from an intermediate device to determine whether the intermediate device received the authorization request, from a mobile device, via a secure communication method (e.g., using a secure transmission protocol).

Although generally described in the context of authorizing and/or authenticating mobile devices based on requests (e.g., authorization requests) sent by a mobile device, the implementations described herein may also be applicable to authorizing and/or authenticating users and/or applications (e.g., apps) that are associated with mobile devices.

Figure 1A:
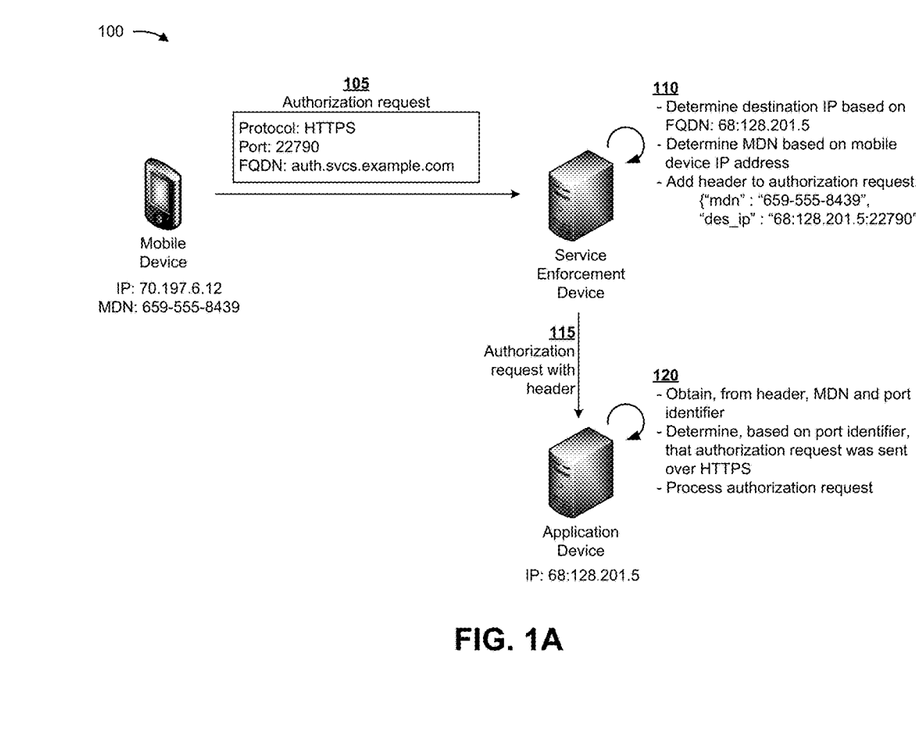
FIGS. 1A and 1B are diagrams of an overview of an example implementation described herein.
Figure 1B:
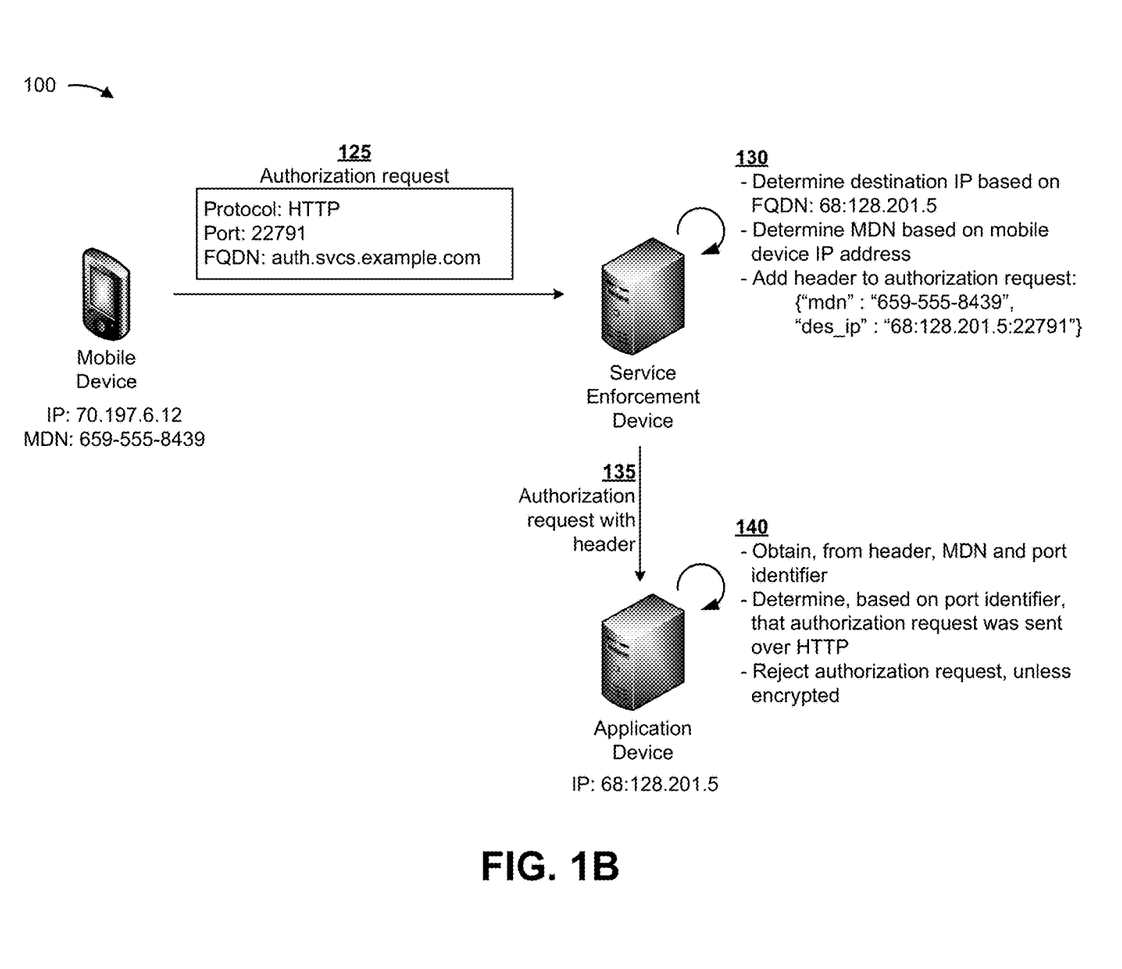

FIGS. 1A and 1B are diagrams of an overview of an example implementation 100 described herein. As shown in FIG. 1A, assume that a mobile device seeks to access content and/or services from an application device having an address (e.g., an internet protocol (IP) address: 68:128.201.5). Further assume that the mobile device has a mobile device identifier (e.g., a mobile device number (MDN): 659-555-8439) and an associated address (e.g., an IP address (e.g., 70.197.6.12) associated with the mobile device's attachment to a network).

As shown in FIG. 1A and by reference number 105, the mobile device may send, to a service enforcement device, an authorization request (e.g., to obtain authorization for the mobile device to access content and/or services associated with the application device). The authorization request may be sent to the service enforcement device using a secure protocol (e.g., hypertext transfer protocol-secure (HTTPS) (e.g., hypertext transfer protocol (HTTP) within a connection encrypted by transport layer security (TLS) or secure sockets layer (SSL)). After the service enforcement device and the mobile device have set up a secure session, the service enforcement device may receive the authorization request at a first port (e.g., port 22790), which is used to receive authorization requests that are sent to the service enforcement device using a secure protocol. The authorization request may include a fully qualified domain name (FQDN) (e.g., auth.svcs.example.com) that is associated with the application device.

As shown by reference number 110, and based on receiving the authorization request, the service enforcement device may determine a destination IP address (e.g., the IP address for the application device: 68:128.201.5) based on the FQDN (e.g., auth.svcs.example.com) that was included in the authorization request. As further shown by reference number 110, the service enforcement device may determine an MDN (e.g., 659-555-8439) for the mobile device based on the IP address (e.g., 70.197.6.12) and a port used by the mobile device when sending the authorization request.

As further shown by reference number 110, the service enforcement device may add a header to the authorization request. In some implementations, the header may be based on the MDN determined for the mobile device and the destination IP address determined for the application device. For example, prior to serialization and encoding, the header may be a JavaScript object notation (JSON) object of the form: {"mdn": "659-555-8439", "des_ip": "68:128.201.5:22790"}, where "des_ip" includes the destination IP address and a port identifier for the first port. By adding the header (e.g., with the MDN for the mobile device), the service enforcement device may authenticate the MDN as belonging to the mobile device. As shown by reference number 115, the service enforcement device may send the authorization request, with the added header, to the application device.

As shown by reference number 120, and based on receiving the authorization request with the added header, the application device may obtain, from the added header, the MDN (e.g., 659-555-8439) for the mobile device and the port identifier (e.g., 22790) for the port at which the service enforcement device received the authorization request. As further shown by reference number 120, the application device may determine, based on the port identifier, that the mobile device used a secure session (e.g., HTTPS) to send the authorization request to the service enforcement device. Based on determining that the mobile device used a secure session to send the authorization request, the application device may process the authorization request for the mobile device based on the mobile device's MDN.

As shown in FIG. 1B, assume that a mobile device, having an MDN (e.g., 659-555-8439) and an associated IP address (e.g., 70.197.6.12), seeks to access content and/or services from an application device having an associated IP address (e.g., 68:128.201.5). As shown by reference number 125, the mobile device may send, to a service enforcement device, an authorization request using an unsecured protocol (e.g., HTTP), such as to avoid latencies that may be associated with setting up a secure session. The service enforcement device may receive the authorization request at a second port (e.g., port 22791), which is used to receive authorization requests that are sent to the service enforcement device using an unsecured protocol. The authorization request may include a fully qualified domain name (FQDN) (e.g., auth.svcs.example.com) that is associated with the application device.

As shown by reference number 130, and based on receiving the authorization request, the service enforcement device may determine a destination IP address (e.g., the IP address for the application device: 68:128.201.5) based on the FQDN (e.g., auth.svcs.example.com) that was included in the authorization request. As further shown by reference number 130, the service enforcement device may determine an MDN (e.g., 659-555-8439) for the mobile device based on the IP address (e.g., 70.197.6.12) and a port used by the mobile device when sending the authorization request.

As further shown by reference number 130, the service enforcement device may add a header to the authorization request, based on the MDN determined for the mobile device and the destination IP address determined for the application device. For example, the header, prior to serialization and encoding, may be a JSON object of the form: {"mdn": "659-555-8439", "des_ip": "68:128.201.5: 22791"}, where "des_ip" includes the destination IP address and a port identifier for the second port. As shown by reference number 135, the service enforcement device may send the authorization request, with the added header, to the application device.

As shown by reference number 140, and based on receiving the authorization request with the added header, the application device may obtain, from the added header, the MDN (e.g., 659-555-8439) for the mobile device and the port identifier (e.g., 22791) for the port at which the service enforcement device received the authorization request. As further shown by reference number 140, the application device may determine, based on the port identifier, that the mobile device used an unsecured protocol (e.g., HTTP) to send the authorization request to the service enforcement device. Based on determining that the mobile device sent the authorization request using an unsecured protocol, the application device may reject the authorization request, unless the authorization request was encrypted (e.g., because the application device may determine that the contents of the authorization request may not be secure).

In this way, implementations described herein may enable a device (e.g., an application device), receiving an authorization request from an intermediate device (e.g., an enforcement device, such as a service enforcement device), to determine whether the intermediate device received the authorization request, from a mobile device, via a secure communication method (e.g., using a secure protocol). Enabling a device, receiving an authorization request from an intermediate device, to determine whether the intermediate device received the authorization request, from a mobile device, via a secure communication method, may reduce consumption of processor resources and/or network resources that would otherwise be needed to determine whether a mobile device had sent a request securely. Enabling a device, receiving an authorization request from an intermediate device, to determine whether the intermediate device received the authorization request via a secure communication method, may additionally, or alternatively, enable mobile devices to send authorization requests using an unsecured session (e.g., using encrypted messages to provide secure communications over HTTP). Thus, implementations described herein may support reduced latencies (e.g., latencies involved in setting up secure communication sessions) associated with mobile devices sending authorization requests to application devices via an intermediate device (e.g., a service enforcement device). Implementations described herein may additionally, or alternatively, reduce consumption of network resources that would otherwise be needed to set up secure communication sessions (e.g., HTTPS sessions).

As indicated above, FIGS. 1A and 1B are provided merely as an example. Other examples are possible and may differ from what was described with regard to FIGS. 1A and 1B.

Figure 2:
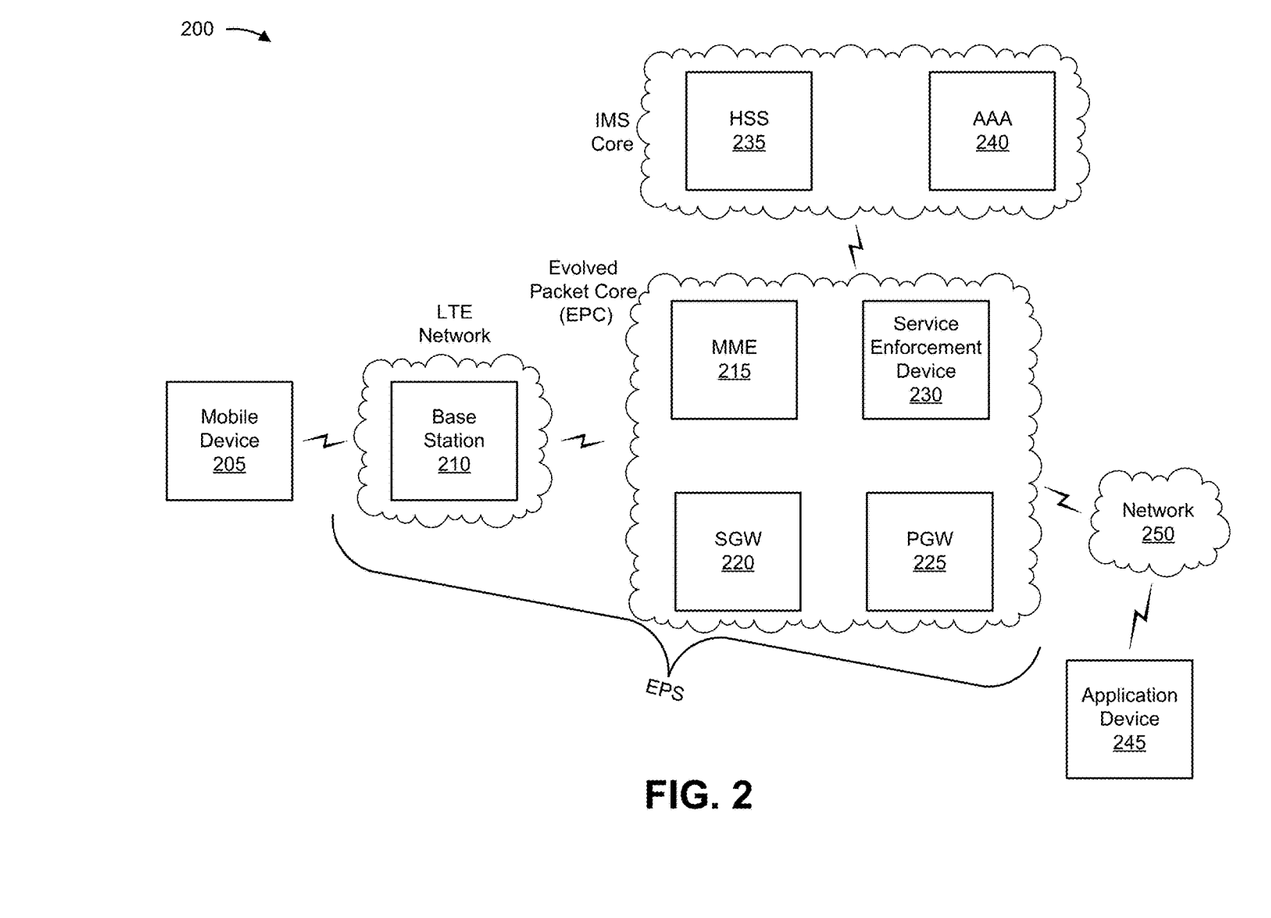
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a service enforcement device 230; a home subscriber server (HSS) 235; an authentication, authorization, and accounting server (AAA) 240; an application device 245; and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, or another type of network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile devices 205 communicate with the EPC. The EPC may include MME 215, SGW 220, PGW 225, and/or service enforcement device 230 that enable mobile devices 205 to communicate with network 250 and/or an Internet protocol (IP) multimedia subsystem (IMS) core. The IMS core may include HSS 235 and/or AAA 240, and may manage device registration and authentication, session initiation, campaign information, etc., associated with mobile devices 205. HSS 235 and/or AAA 240 may reside in the EPC and/or the IMS core.

Mobile device 205 includes one or more devices capable of communicating with base station 210 and/or a network (e.g., network 250). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses or a smart watch), a machine device, and/or a similar device. Mobile device 205 may send traffic to and/or receive traffic from network 250 (e.g., via base station 210, SGW 220, and/or PGW 225).

Base station 210 includes one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a radio access network that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to mobile device 205 via base station 210. Additionally, or alternatively, SGW 220 may perform operations associated with handing off mobile device 205 to and/or from an LTE network.

PGW 225 includes one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to mobile device 205 via SGW 220 and base station 210. PGW 225 may record data usage information (e.g., byte usage), and may provide the data usage information to HSS 235. In some implementations, PGW 225 may create a binding between mobile device 205's address (e.g., a network address, such as an IP address) and mobile device 205's mobile device identifier (e.g., an MDN, an international mobile subscriber identity (IMSI), a temporary mobile subscriber identity (TMSI), or the like). In some implementations, the binding between mobile device 205's address and mobile device 205's mobile device identifier may be included in pilot packets and may be stored in a suitable data structure (e.g., a pilot packet database, a database that includes data from the IMS Rf interface (e.g., data created from Diameter protocol messaging), or another suitable database that may store a mapping between mobile device 205's address and mobile device 205's mobile device identifier).

Service enforcement device 230 includes one or more devices capable of inspecting traffic and adding information to the traffic. For example, service enforcement device 230 may include a gateway, a router, a modem, a switch, a firewall, a NIC, a hub, a bridge, a server (e.g., a proxy server), an OADM, or a similar device. Service enforcement device 230 may receive an authorization request from mobile device 205 and add information (e.g., by inserting a header) to the authorization request, as described in more detail elsewhere herein. Service enforcement device 230 may instruct AAA 240 how to charge for data usage associated with the traffic. In some implementations, different service enforcement devices 230 may be associated with different geographic regions and/or cellular service areas. In some implementations, service enforcement device 230 may be used to support a toll-free data service campaign. For example, service enforcement device 230 may be used for toll-free data service traffic detection, byte counting, and traffic modification.

HSS 235 includes one or more devices, such as one or more server devices, capable of managing (e.g., receiving, generating, storing, processing, and/or providing) information associated with mobile device 205. For example, HSS 235 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address, such as an IP address) that identifies mobile device 205, information that identifies a treatment of mobile device 205 (e.g., quality of service information, a quantity of minutes allowed per time period, or a quantity of data consumption allowed per time period), and/or similar information. HSS 235 may provide this information to one or more other devices of environment 200 to support the operations performed by those devices.

AAA 240 includes one or more devices, such as one or more server devices, that perform authentication, authorization, and/or accounting operations for communication sessions associated with mobile device 205. For example, AAA 240 may store data usage information for mobile device 205, for a user associated with mobile device 205, for application device 245, for an application provider (e.g., that provides and/or supports an application associated with application device 245), or the like.

Application device 245 includes one or more devices, such as one or more server devices (e.g., a content server, a host server, a web server, an application server, a database server, a voice portal server, a payment processing server, a credit card processing server, or the like), capable of receiving, generating, storing, processing, and/or providing information associated with an application or app (e.g., an application or app with a back end supported by application device 245) and/or third party content. In some implementations, application device 245 may be located in a data center. In some implementations, application device 245 may authenticate mobile device 205 based on information that service enforcement device 230 has added to an authorization request that was made by mobile device 205, as described in more detail elsewhere herein.

Network 250 includes one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
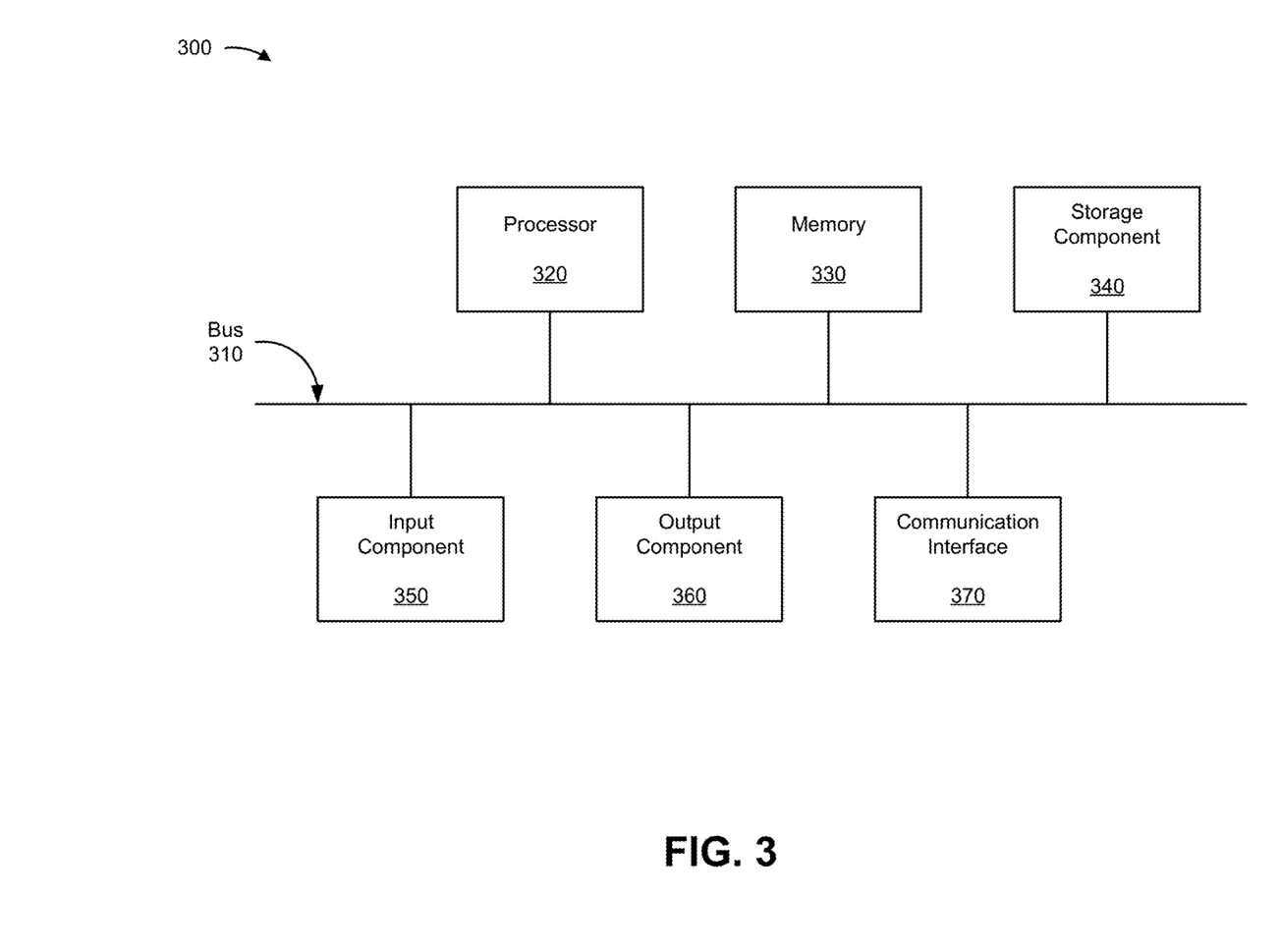
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, service enforcement device 230, HSS 235, AAA 240, and/or application device 245. In some implementations, mobile device 205, base station 210, MME 215, SGW 220, PGW 225, service enforcement device 230, HSS 235, AAA 240, and/or application device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
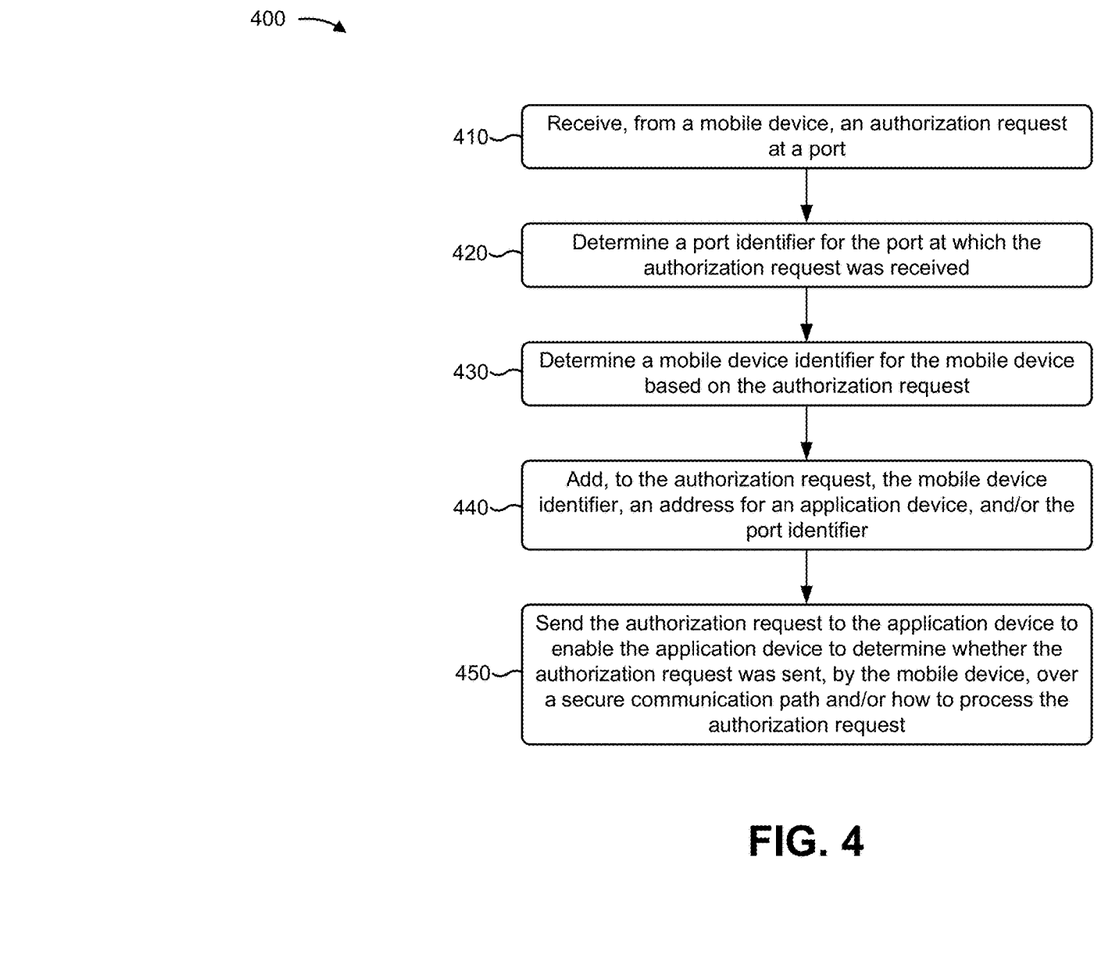
FIG. 4 is a flow chart of an example process for differentiating authorization requests for security requirements.

FIG. 4 is a flow chart of an example process 400 for differentiating authorization requests for security requirements. In some implementations, one or more process blocks of FIG. 4 may be performed by service enforcement device 230. In some implementations, one or more process blocks of FIG. 4 may be performed by another device or a group of devices separate from or including service enforcement device 230, such as mobile device 205, base station 210, MME 215, SGW 220, PGW 225, HSS 235, AAA 240, and/or application device 245.

As shown in FIG. 4, process 400 may include receiving, from a mobile device, an authorization request at a port (block 410). For example, service enforcement device 230 may receive an authorization request from mobile device 205.

In some implementations, the authorization request may have been sent by mobile device 205 to request access, for mobile device 205, to content and/or services associated with application device 245. In some implementations, an application on mobile device 205 may cause mobile device 205 to send the authorization request (e.g., through the application or a web browser on mobile device 205). In some implementations, the authorization request may include a fully qualified domain name (FQDN) (e.g., auth.svcs.example.com) that is associated with application device 245.

Service enforcement device 230 may receive the authorization request at a port. In some implementations, service enforcement device 230 may receive the authorization request at a particular transmission control protocol (TCP) port based on whether the authorization request was sent to service enforcement device 230 using a secure transmission protocol. For example, if mobile device 205 sent the authorization request using a secure transmission protocol (e.g., HTTPS), mobile device 205 sends the authorization request to, and service enforcement device 230 receives the authorization request at, a first port. However, if mobile device 205 sent the authorization request using an unsecured transmission protocol (e.g., HTTP), mobile device 205 sends the authorization request to, and service enforcement device 230 receives the authorization request at, a different port (e.g., a second port).

In some implementations, prior to receiving an authorization request using a secure transmission protocol, service enforcement device 230 may receive a request to set up a secure session (e.g., an HTTPS session). In some implementations, the request to set up the secure session may be received, by service enforcement device 230, at the first port. After the secure session is set up, service enforcement device 230 may receive the authorization request.

If service enforcement device 230 receives an authorization request over an unsecured communication path (e.g., via HTTP and at the second port), latencies and network resource expenditures that are associated with setting up a secure session (e.g., an HTTPS session) may be avoided.

As further shown in FIG. 4, process 400 may include determining a port identifier for the port at which the authorization request was received (block 420). For example, service enforcement device 230 may determine a port identifier (e.g., a port name or a port number) for the port at which service enforcement device 230 received the authorization request. In some implementations, service enforcement device 230 may assign a first port identifier (e.g., 22790 or another suitable port number) to the first port (e.g., the port at which authorization requests are received when sent using a secure transmission protocol) and a second port identifier (e.g., 22791 or another suitable port number) to the second port (e.g., the port at which authorization requests are received when sent using an unsecured transmission protocol).

As further shown in FIG. 4, process 400 may include determining a mobile device identifier for the mobile device based on the authorization request (block 430). For example, service enforcement device 230 may determine a mobile device identifier (e.g., an MDN, an IMSI, or a TMSI) for mobile device 205 based on the authorization request. In some implementations, the mobile device identifier, for mobile device 205, may include an MDN and an IMSI.

In some implementations, service enforcement device 230 may determine a mobile device identifier for mobile device 205 based on mobile device 205's address (e.g., a network address, such as an IP version 4 (IPv4) address, an IPv4 address and a port, and/or an IP version 6 (IPv6) address), which service enforcement device 230 may determine based on the authorization request. For example, service enforcement device 230 may receive the address (e.g., a network address, such as an IPv4 address, an IPv4 address and a port, and/or an IPv6 address) for a current network attachment of mobile device 205 (e.g., based on the address from which service enforcement device 230 received the authorization request). Service enforcement device 230 may then determine mobile device 205's mobile device identifier based on a binding, created by PGW 225, between mobile device 205's address and mobile device 205's mobile device identifier. In some implementations, service enforcement device 230 may obtain the mobile device identifier from a query, based on the address for mobile device 205, of an appropriate data structure (e.g., a pilot packet database, a database that includes data from the IMS Rf interface (e.g., data created from Diameter protocol messaging), or another suitable database that may store a mapping between mobile device 205's address and mobile device 205's mobile device identifier).

As further shown in FIG. 4, process 400 may include adding, to the authorization request, the mobile device identifier, an address for an application device, and/or the port identifier (block 440). For example, service enforcement device 230 may add, to the authorization request, the mobile device identifier for mobile device 205, an address (e.g., a network address, such as an IP address) for application device 245, and/or the port identifier for the port at which service enforcement device 230 received the authorization request.

In some implementations, service enforcement device 230 may determine the address for application device 245 based on an FQDN for application device 245 that was included in the authorization request. For example, service enforcement device 230 may resolve the FQDN (e.g., auth.svcs.example.com) to obtain a corresponding IP address (e.g., 68:128.201.5) for application device 245. In some implementations, service enforcement device 230 may obtain the IP address for application device 245 based on a lookup in a suitable data structure (e.g., a data structure that stores a mapping between the FQDN and the IP address for application device 245). In some implementations, service enforcement device 230 may send a query, based on the FQDN for application device 245, to another device (e.g., PGW 225) and receive the IP address for application device 245 from the other device.

In some implementations, service enforcement device 230 may additionally add, to the authorization request, an identifier for service enforcement device 230, a time associated with adding information to the authorization request, mobile device 205's address (e.g., mobile device 205's IP address), an authentication method identifier, and/or a destination IP address. In some implementations, the identifier for service enforcement device 230 may be based on some or all of a common language location identifier (CLLI) code for service enforcement device 230 or may be based on a network address for service enforcement device 230. In some implementations, the authentication method identifier may identify a method that was used to determine mobile device 205's mobile device identifier (e.g., MDN, IMSI, or TMSI) based on mobile device 205's address (e.g., as discussed above with regard to block 430).

In some implementations, the destination IP address may be an IP address associated with application device 245. In some implementations, the destination IP address added to the authorization request may include an address for application device 245 and the port identifier for the port at which service enforcement device 230 received the authorization request. For example, if the address for application device 245, as determined by service enforcement device 230, is the IP address 68:128.201.5, and the port identifier is 22790 (e.g., for a port at which service enforcement device 230 receives authorization requests that were sent using a secure protocol (e.g., HTTPS)), service enforcement device 230 may determine a destination IP address of 68:128.201.5: 22790. Alternatively, if the address for application device 245 is the IP address 68:128.201.5, and the port identifier is 22791 (e.g., for a port at which service enforcement device 230 receives authorization requests that were sent using an unsecured protocol (e.g., HTTP)), service enforcement device 230 may determine a destination IP address of 68:128.201.5:22791.

In some implementations, service enforcement device 230 may add, to the authorization request, a header and/or a trailer. The added header and/or trailer may include mobile device 205's mobile device identifier, the address for application device 245, and/or the port identifier. In some implementations, the added header and/or trailer may additionally include the identifier for service enforcement device 230, the time associated with adding information to the authorization request, mobile device 205's address, the authentication method identifier, and/or the destination IP address. In some implementations, service enforcement device 230 may add, to one or more fields of an existing header, an existing trailer, and/or a payload of the authorization request, mobile device 205's mobile device identifier, the address for application device 245, the port identifier, the identifier for service enforcement device 230, the time associated with adding information to the authorization request, mobile device 205's address, the authentication method identifier, and/or the destination IP address.

In some implementations, the header may be a JSON object, which may have been serialized and encoded (e.g., using Base64url encoding). In some implementations, the time associated with adding information to the authorization request may be the time when the JSON object was created.

In some implementations, service enforcement device 230 may add the mobile device identifier for mobile device 205, to the authorization request, to authenticate the mobile device identifier as belonging to mobile device 205.

As further shown in FIG. 4, process 400 may include sending the authorization request to the application device to enable the application device to determine whether the authorization request was sent, by the mobile device, over a secure communication path and/or how to process the authorization request (block 450). For example, service enforcement device 230 may send the authorization request (e.g., with the added mobile device identifier, address for the application device, and/or port identifier) to application device 245. In some implementations, service enforcement device 230 may use an unsecured communication path (e.g., over HTTP) to send the authorization request (e.g., with the added mobile device identifier, address for the application device, and/or port identifier) to application device 245. In some implementations, service enforcement device 230 may use a secured communication path (e.g., over HTTPS) to send the authorization request (e.g., with the added mobile device identifier, address for the application device, and/or port identifier) to application device 245.

Upon receiving the authorization request, from service enforcement device 230, application device 245 may obtain the mobile device identifier and port identifier from the authorization request. In some implementations, application device 245 may obtain the port identifier from the destination IP address that service enforcement device 230 added to the authorization request.

In some implementations, application device 245 may determine whether mobile device 205 sent the authorization request, to service enforcement device 230, over a secure communication path. For example, application device 245 may determine whether mobile device 205 sent the authorization request, to service enforcement device 230, over a secure communication path based on the port identifier for the port at which service enforcement device 230 received the authorization request from mobile device 205. If the port identifier (e.g., 22790) that application device 245 obtained from the destination IP address corresponds to the port at which service enforcement device 230 receives authorization requests that are sent using a secure transmission protocol (e.g., via HTTPS), application device 245 may determine that mobile device 205 sent the authorization request, to service enforcement device 230, over a secure communication path. Alternatively, if the port identifier (e.g., 22791) that application device 245 obtained from the destination IP address corresponds to the port at which service enforcement device 230 receives authorization requests that are sent using an unsecured transmission protocol (e.g., via HTTP), application device 245 may determine that mobile device 205 sent the authorization request, to service enforcement device 230, over an unsecured communication path.

In some implementations, enabling application device 245 to determine whether mobile device 205 sent the authorization request to service enforcement device 230 over a secure communication path may enable application device 245 to determine how to process the authorization request. For example, if mobile device 205 sent the authorization request securely (e.g., using HTTPS), then application device 245 may determine that the information in the authorization request may be considered secure, and application device 245 may determine, based on the authorization request, whether to authorize mobile device 205 and/or to provide content and/or services to mobile device 205. In contrast, if mobile device 205 sent the authorization request using an unsecure transmission method (e.g., using HTTP), application device 245 may require the information in the authorization request to have been secured by another mechanism (e.g., encrypting the authorization request, or the information, with a shared secret key). If the information in the authorization request was not secured, application device 245 may reject the authorization request (e.g., for not meeting security requirements).

In some implementations, application device 245 may use the mobile device identifier (e.g., as added to the authorization request by service enforcement device 230) to authenticate mobile device 205. For example, application device 245 may authenticate mobile device 205 based on service enforcement device 230 having determined the mobile device identifier for mobile device 205.

In some implementations, application device 245 may determine what method service enforcement device 230 used to determine mobile device 205's mobile device identifier based on mobile device 205's address. For example, service enforcement device 230 may add, to the authorization request, an identifier associated with a data structure (e.g., a database) that was consulted to obtain a mapping between mobile device 205's address and mobile device 205's mobile device identifier. In some implementations, service enforcement device 230 may additionally, or alternatively, add to the authorization request, an indication of what type of address (e.g., an IPv4 or IPv6 address) was used for mobile device 205's address when obtaining the mapping.

Enabling application device 245 to determine the method used to determine mobile device 205's mobile device identifier may enable application device 245 to assign a confidence rating to the mobile device identifier. For example, application device 245 may assign a confidence rating based on an accuracy with which the method determines mobile device identifiers, such as based on error rates associated with a database that was consulted to obtain a mapping between mobile device 205's address and mobile device 205's mobile device identifier. In some implementations, if the confidence rating is above a threshold, application device 245 may determine that mobile device 205 has been sufficiently authenticated, and application device 245 may proceed with determining whether to authorize mobile device 205 and/or to provide content and/or services to mobile device 205. Alternatively, if the confidence rating is below a threshold, application device 245 may determine that additional authentication (e.g., based on another authentication method, consulting a different database to obtain a mapping between mobile device 205's address and mobile device 205's mobile device identifier, or the like) may be needed for mobile device 205 before application device 245 proceeds with determining whether to authorize mobile device 205 and/or to provide content and/or services to mobile device 205.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, implementations described herein may enable a device (e.g., application device 245) receiving an authorization request from an intermediate device (e.g., service enforcement device 230) to determine whether the intermediate device received the authorization request, from a mobile device (e.g., mobile device 205), via a secure communication method (e.g., using a secure transmission protocol). Enabling a device, receiving an authorization request from an intermediate device, to determine whether the intermediate device received the authorization request, from a mobile device, via a secure communication method, may reduce consumption of processor resources and/or network resources that would otherwise be needed to determine whether a mobile device had sent a request securely. Enabling a device, receiving an authorization request from an intermediate device, to determine whether the intermediate device received the authorization request via a secure communication method, may additionally, or alternatively, enable mobile devices to send authorization requests using an unsecured session (e.g., using encrypted messages to provide secure communications over HTTP). Thus, implementations described herein may support reduced latencies (e.g., latencies involved in setting up secure communication sessions) associated with mobile devices sending authorization requests to application devices via an intermediate device (e.g., a service enforcement device). Implementations described herein may additionally, or alternatively, reduce consumption of network resources that would otherwise be needed to set up secure communication sessions (e.g., HTTPS sessions).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors; and
one or more memory devices storing instructions that, when executed by the one or more processors, cause the one or more processors to:
receive, from a mobile device, a request at a port of the device, the port relating to whether the request was sent, by the mobile device, over a secure communication path;
determine a port identifier for the port of the device;

determine a mobile device identifier for the mobile device, the mobile device identifier being determined based on the request;
add, to the request, the mobile device identifier and the port identifier; and
send the request to an application device after adding the mobile device identifier and the port identifier to the request, the port identifier being added to the request to enable the application device to determine whether the request was sent, by the mobile device, over the secure communication path.

2. The device of claim 1,
where the port is a first port or a second port; and
where the one or more processors, when receiving, from the mobile device, the request at the port, are to:
receive the request at one of the first port or the second port,
the request being received at the first port when the request is sent over the secure communication path, and
the request being received at the second port when the request is sent over an unsecured communication path.

3. The device of claim 1,
where the one or more processors are further to:
add a header to the request; and
where the one or more processors, when adding, to the request, the mobile device identifier and the port identifier, are to:
add the mobile device identifier and the port identifier to the header.

4. The device of claim 1,
where the mobile device identifier and the port identifier are included in a JavaScript object notation (JSON) object; and
where the one or more processors, when adding, to the request, the mobile device identifier and the port identifier, are to:
add the JSON object to the request.

5. The device of claim 1,
where the request is a request for the mobile device to receive at least one of content or a service from the application device.

6. The device of claim 1, where the one or more processors, when sending the request to the application device, are to:
send the request to the application device using an unsecured communication path.

7. The device of claim 1, where the one or more processors, when determining the mobile device identifier for the mobile device, are to:
determine the mobile device identifier based on an address associated with the mobile device.

8. A non-transitory computer-readable medium storing instructions, the instructions comprising:
one or more instructions that, when executed by one or more processors of a device, cause the one or more processors to:
receive a request from a mobile device;
determine a port identifier for a port of the device at which the request was received,
the port relating to whether a secure communication path was used, by the mobile device, to send the request;
determine a mobile device identifier for the mobile device,
the mobile device identifier being determined based on the request;
add, to the request, the mobile device identifier and the port identifier; and
send the request to an application device after adding the mobile device identifier and the port identifier to the request,
the port identifier being added to the request to enable the application device to determine whether the request was received, from the mobile device, over the secure communication path.

9. The non-transitory computer-readable medium of claim 8,
where the port is a first port or a second port; and
where the one or more instructions, that cause the one or more processors to receive the request from the mobile device, cause the one or more processors to:
receive the request at one of the first port or the second port,
the request being received at the first port when the request is received over the secure communication path, and
the request being received at the second port when the request is not received over the secure communication path.

10. The non-transitory computer-readable medium of claim 8,
where the mobile device identifier and the port identifier are included in a JavaScript object notation (JSON) object; and
where the one or more instructions, that cause the one or more processors to add, to the request, the mobile device identifier and the port identifier, cause the one or more processors to:
add the JSON object to the request.

11. The non-transitory computer-readable medium of claim 8, where the one or more instructions, that cause the one or more processors to send the request to the application device, cause the one or more processors to:
send the request to the application device using an unsecured communication path.

12. The non-transitory computer-readable medium of claim 8, where the one or more instructions, that cause the one or more processors to determine the mobile device identifier for the mobile device, cause the one or more processors to:
determine the mobile device identifier using an address associated with the mobile device to look up the mobile device identifier in a data structure.

13. The non-transitory computer-readable medium of claim 12, where the one or more instructions, when executed by the one or more processors, further cause the one or more processors to:
add, to the request, an identifier associated with the data structure.

14. The non-transitory computer-readable medium of claim 8, where the one or more instructions, that cause the one or more processors to receive the request from the mobile device, cause the one or more processors to:
receive the request, from the mobile device, over hypertext transfer protocol (HTTP).

15. A method, comprising:
receiving, by a device, a request from a mobile device;
determining, by the device, a port identifier for a port of the device, the port corresponding to whether a secure communication path was used, by the mobile device, to send the request;

determining, by the device, a mobile device identifier for the mobile device;

adding, by the device, the mobile device identifier and the port identifier to the request; and sending, by the device, the request to an application device after adding the mobile device identifier and the port identifier to the request, the port identifier being added to the request to enable the application device to determine whether the request was sent, by the mobile device, over the secure communication path.

16. The method of claim 15, where the port is a first port or a second port; and where receiving the request from the mobile device comprises:

receiving the request at one of the first port or the second port, the request being received at the first port when the request is sent over the secure communication path, and the request being received at the second port when the request is sent over an unsecured communication path.

17. The method of claim 15, where determining the mobile device identifier for the mobile device comprises:

determining the mobile device identifier using an address associated with the mobile device to look up the mobile device identifier in a data structure; and the method further comprising:

adding, to the request, an identifier associated with the data structure.

18. The method of claim 15, where the request is a request for the mobile device to obtain authorization to access at least one of content or a service on the application device.

19. The method of claim 15, further comprising:

adding a header to the request; and where adding the mobile device identifier and the port identifier to the request comprises:

adding the mobile device identifier and the port identifier to the header before adding the header to the request.

20. The method of claim 15, where sending the request to the application device comprises:

sending the request to the application device using an unsecured communication path.

* * * * *